United States Patent [19]
Johnson et al.

[11] Patent Number: 5,647,337
[45] Date of Patent: Jul. 15, 1997

[54] ENGINE BREATHER DEVICE WITH COOLING BAFFLE

[75] Inventors: Richard D. Johnson, Sheboygan; Jerry R. Reineking, Cleveland, both of Wis.

[73] Assignee: Kohler Co., Kohler, Wis.

[21] Appl. No.: 604,557

[22] Filed: Feb. 21, 1996

[51] Int. Cl.⁶ .................................................. F02M 25/06
[52] U.S. Cl. ................................................... 123/572
[58] Field of Search ............................ 123/572, 573, 123/574, 41.86

[56] References Cited

U.S. PATENT DOCUMENTS

| | | |
|---|---|---|
| 1,480,866 | 1/1924 | Smith . |
| 2,098,741 | 11/1937 | Christian . |
| 2,340,855 | 2/1944 | Abrams . |
| 2,422,936 | 6/1947 | Sweger . |
| 2,966,146 | 12/1960 | Schweitzer et al. . |
| 3,456,759 | 7/1969 | Henry-Biabaud . |
| 4,204,486 | 5/1980 | Nagagawa et al. . |
| 4,528,969 | 7/1985 | Senga ........................ 123/572 |
| 4,541,399 | 9/1985 | Tanaka et al. ............. 123/572 |
| 4,603,673 | 8/1986 | Hiraoka et al. ............ 123/572 |
| 4,656,991 | 4/1987 | Fukuo et al. .............. 123/572 |
| 4,947,812 | 8/1990 | Inoue et al. ............... 123/572 |
| 4,961,405 | 10/1990 | Dorsch . |

Primary Examiner—Marguerite McMahon
Attorney, Agent, or Firm—Quarles & Brady

[57] ABSTRACT

A breather device for an internal combustion engine is disclosed which has a simplified construction yet assists in engine cooling. Cooling baffle elements are formed in a one-piece construction and extend outwardly from the device to direct cooling air over engine fins. The breather device does not take up valuable space around the engine as it is accommodated in the vee. Because of its simplified construction, it is easily connected to the engine and removed therefrom for maintenance purposes.

8 Claims, 3 Drawing Sheets

ENGINE BREATHER DEVICE WITH COOLING BAFFLE

BACKGROUND OF THE INVENTION

A. Field of the Invention

This invention relates to internal combustion engines having breathing ports and cooling fins. More particularly, the invention relates to a simplified breathing device for internal combustion engines which device also assists in engine cooling.

B. Description of the Art

It is known to provide breathers for air-cooled engines. These typically fall into two classifications: external canister type and internal types that are integral to the crankcase. The external canister is attached to the crankcase and induction system via hoses. This utilizes multiple assembly joints requiring assembly time and a potential for oil leakage. The canister is placed on the outside of the engine and takes up much desired space. Further, the path from the crankcase through the canister is not readily accessible.

Concerning the internal type of breather, it is both cast into the crankcase and machined into the casting. This adds cost for both the casting tool and the casting piece price, as the casting is more complex. Also, there are additional costs to machine the casting.

It is also known in conjunction with air-cooled, vee configuration engines to supply baffles which are placed inside the vee to direct cooling air against the cooling fins. These are typically stamped from sheet metal or injection molded and are separate and distinct from the breather system.

Thus, an improved engine breather device is desired.

SUMMARY OF THE INVENTION

In one embodiment, the present invention includes a combined engine breather device with cooling baffles. A base member is adapted to fit in the vee of a vee-type engine. A cover member is connected to the base member and has an opening therein.

Baffle elements project outwardly from the base member and are constructed in a one-piece manner therewith. A conduit member extends from a floor of the base member for communication with a passage in an engine crankcase. Fastening means are adapted to connect the breather device to the engine.

In another embodiment, a valve member is connected to the conduit member and is a one-way reed valve.

In one aspect a flexible tubular member is connected at one end to the opening in the cover member and at another end to an air intake.

In another aspect, the baffle elements have fastener openings for connecting the baffle elements to cooling fins of the engine.

In a preferred embodiment, the base member, baffle elements and cover member are all composed of a resinous plastic material.

It is therefore an object of the present invention to provide an engine breather device which is simple in its construction yet assists in engine cooling.

It is another object of the present invention to provide a breather device of the foregoing type which can be placed in the vee of an engine.

It is yet another object of this invention to provide a breather device of the foregoing type which is easily assembled and connected to an engine.

It is still another object of the present invention to provide a breather device of the foregoing type which results in a reduction of manufacturing costs.

The foregoing and other objects and advantages of the invention will appear from the following description. In the description, reference is made to the accompanying drawings in which there is shown by way of illustration a preferred embodiment of the invention. Such embodiment does not represent the full scope of the invention. Reference should therefore be made to the claims for interpreting the scope of the present invention.

DESCRIPTION OF THE PREFERRED EMBODIMENT

Figure 1:
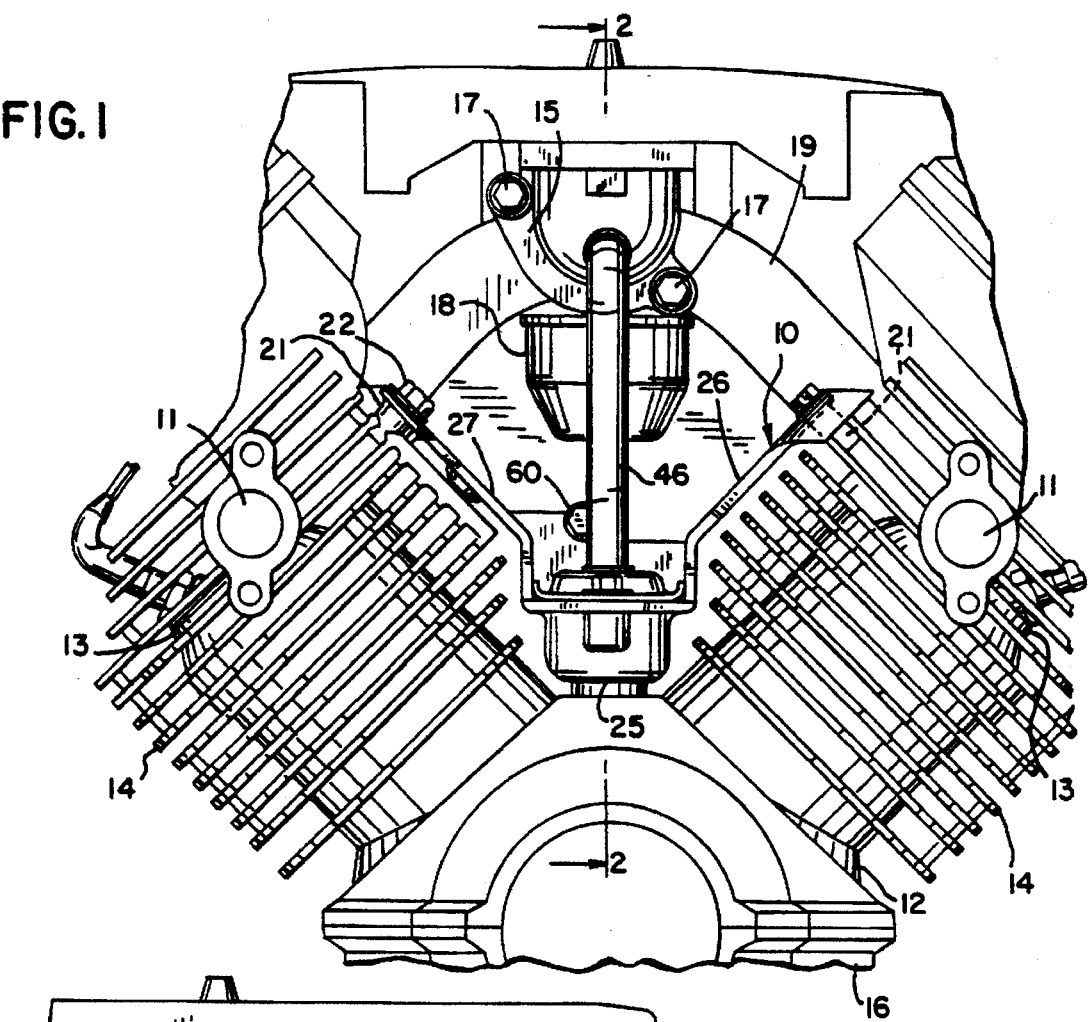
FIG. 1 is a partial end view showing of an engine illustrating the breather device connected thereto.
Figure 8:
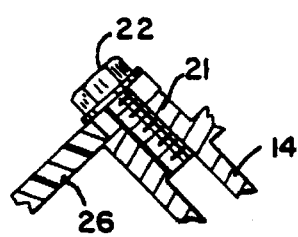
FIG. 8 is a sectional view taken along line 8—8 of FIG. 2.

Referring to FIG. 1, the combined engine breathing device with cooling baffles generally 10 is shown in conjunction with a vee engine 12 composed of cylinders 13 with cooling fins 14. There is the usual crankcase 16 as well as a carburetor 18 and an air intake manifold 19. The breather device 10 is positioned in the vee 20 of the engine. In FIG. 1, the reference number 11 refers to an exhaust port, while 15 is a carburetor elbow secured by bolts 17.

Figure 2:
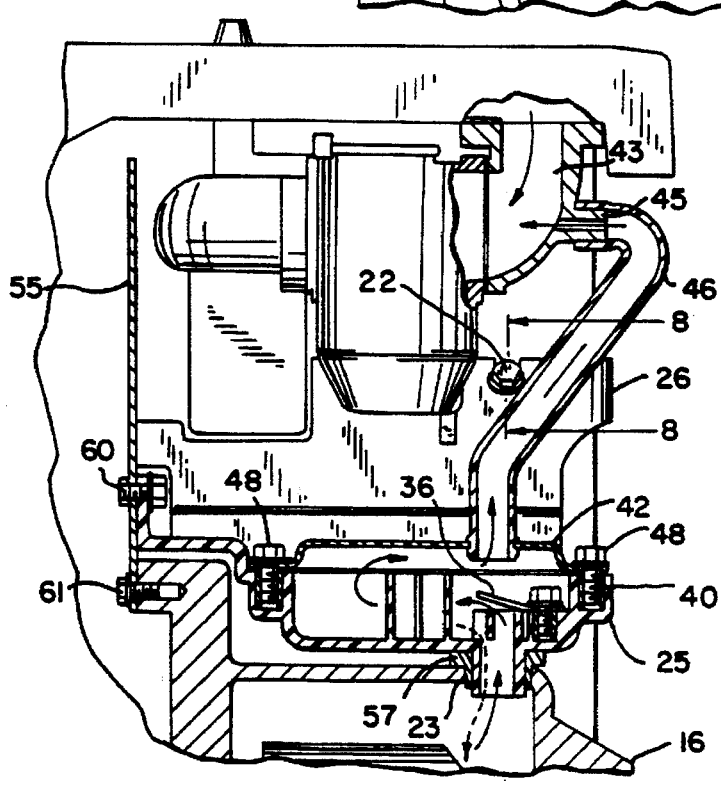
FIG. 2 is a sectional view taken along line 2—2 of FIG. 1.
Figure 3:
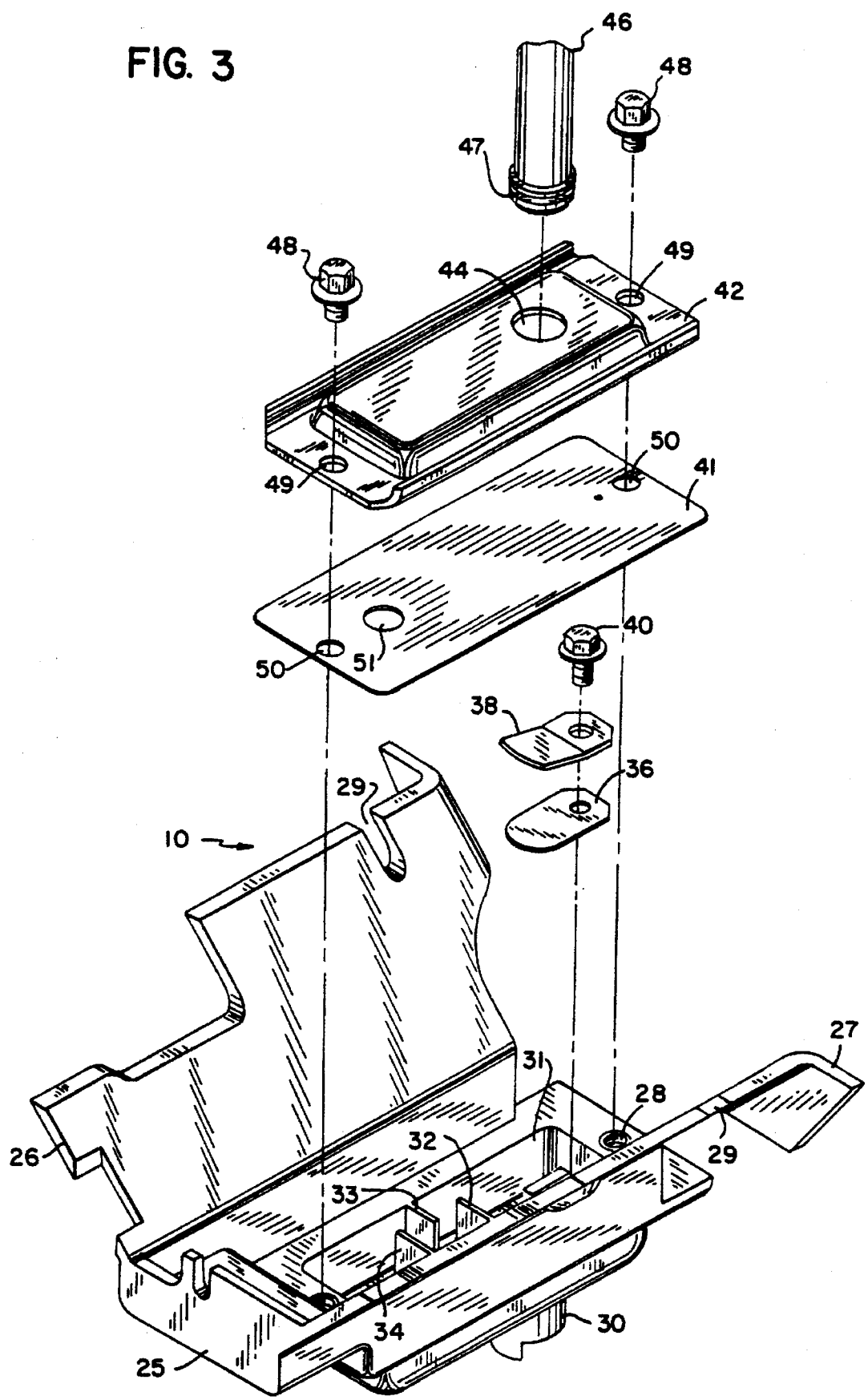
FIG. 3 is an exploded view of the breather device.
Figure 4:
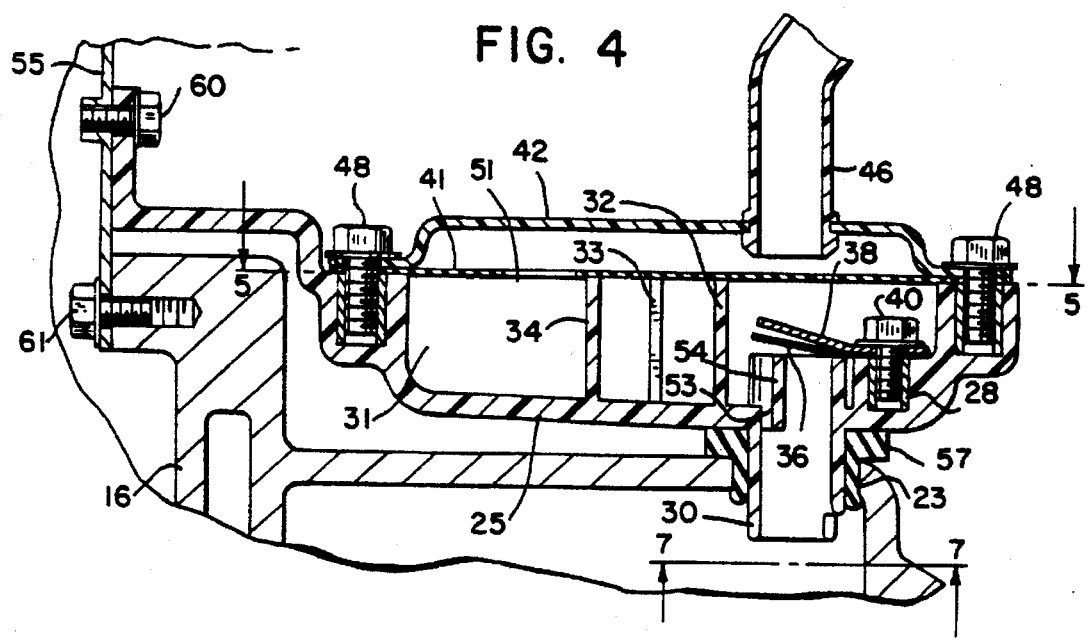
FIG. 4 is an enlarged sectional view of the breather device.

Referring specifically to FIGS. 2, 3 and 4, the breather device 10 includes a base member 25 and outwardly extending baffle elements 26 and 27. A conduit member 30 extends from base member 25 for fluid communication with crankcase 16 through passage 23. Disposed in an offset manner in the cavity portion 31 of the base member 25 are baffle portions 32, 33, 34 and 35 with baffle portion 35 being shown in FIG. 5. A reed 36 and a reed retainer 38 are secured to the base member 25 by the bolt 40 threaded into bushing 28. The reed 36 is positioned over an end of conduit member 30 so as to act as a breather valve when pressure in the crankcase reaches a predetermined level.

A gasket 41 having an opening 51 is secured over the cavity portion 31 and contacts the upper surfaces of the baffle portions 32–35. It is positioned under the cover member 42 in a spaced manner by means of openings 50 in the gasket 41 for receiving the bolts 48 which also pass through the openings 49 in the cover. A flexible tube 46 having a grommet ending 47 is connected in an opening 44 in the cover member 42 and extends upwardly in an angular manner for connection with the air intake 43 having a connecting portion 45.

Referring specifically to FIG. 4, it is seen that the base member 25 is secured to the crankcase 16 by the bolt 60 engaging a plate 55 which in turn is connected to the crankcase 16 by the bolt 61. The baffle elements 26 and 27 are also connected to the cooling fins 14 such as by the bosses 21 and the bolts 22 extending through the slots 29 of the baffle elements 26 and 27. This is seen in FIGS. 1, 2 and 3.

Figure 7:
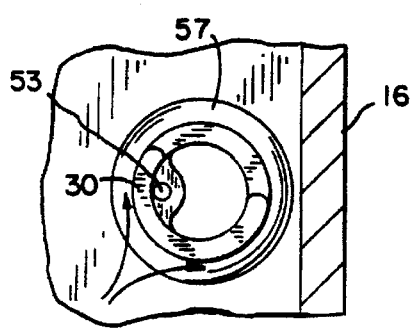
FIG. 7 is a sectional view taken along line 7—7 of FIG. 4.

As shown in FIGS. 4 and 7, the conduit member 30 is sealed in the passage 23 of the crankcase by the grommet 57. This provides a secure seal yet easy removal of the breather device.

Figure 5:
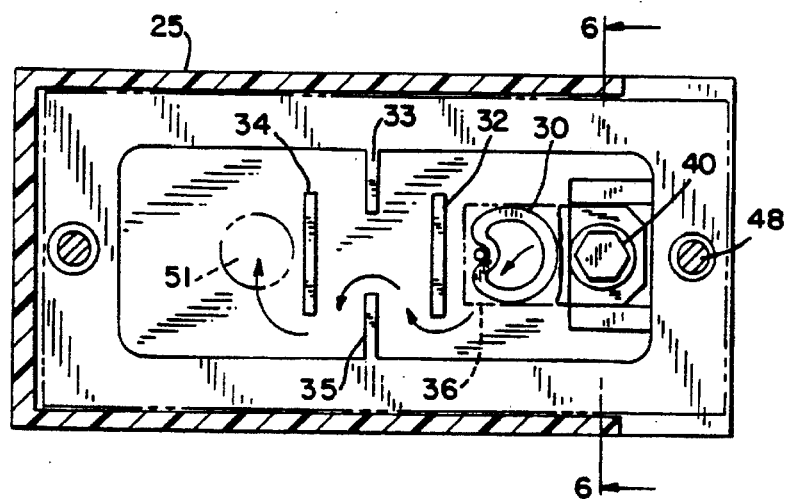
FIG. 5 is a sectional view taken along line 5—5 of FIG. 4.
Figure 6:
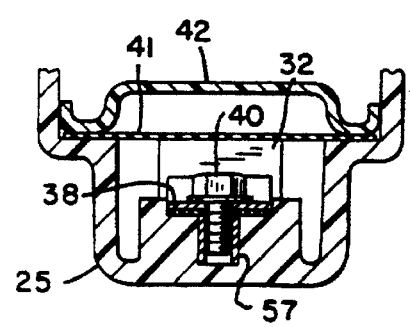
FIG. 6 is a sectional view taken along line 6—6 of FIG. 5.

Referring to FIGS. 4, 5 and 6, there is a flow path between the crankcase 16 and the flexible tube 46 which is under the reed 36, around the baffles 32–35 and upwardly through the opening 51 and between the gasket 41 and the cover member 42 to the flexible tube 46. This circuitous path as well as the fact that the flexible tube 46 angles upwardly to the air intake 43 helps obviate the passage of oil out of the crankcase 16 and through the breather device 10. The return of oil to the crankcase 16 from the base member 25 and the baffle portions 32–35 is assisted by the passage 53 and the adjacent inset wall portion 54 of the conduit member 30. This is illustrated in FIGS. 4 and 7 and is an important feature.

Another important feature of the breather device 10 is not only the fact that it can be placed in the vee of the engine and thereby utilize normally unused space, but also the fact that it has the baffle elements 26 and 27 for directing cooling air over the cooling coils 14.

Yet another important feature of the breather device 10 with the base member 25 is the molding of the baffle elements 26 and 27 with the base member 25 from a resinous plastic in a one-piece manner. This provides cost reduction in not only the manufacturing process but also in the placement of the breather device in the engine 12, in that direct communication is made to the crankcase 16 by the conduit member 30. In a preferred manner, the cover member 42 is also molded of the same material as the base member 25.

Baffle portions 32–35 are employed in conjunction with the gasket 41 to assist in the prevention of oil entering into the carburetor 18. These could be eliminated or a different pattern employed although efficiency would be sacrificed. Further, the reed valve as represented by reed 36 could be replaced with other types of relief valves.

It will be apparent to those skilled in the art that other variations besides these can be made to the preferred embodiment described herein without departing from the spirit of the invention. The claims should therefore be looked at to judge the full scope of the invention.

What is claimed is:

1. A combined engine breather device with cooling baffles comprising:

a base member adapted to fit in the vee of a vee-type engine;

a cover member connected to the base member and having an opening therein;

baffle elements projecting outwardly from the base member and constructed in a one-piece manner therewith, said baffle elements adapted to extend over cooling fins of the vee-type engine;

a conduit member extending from a floor of the base member for communication with a passage in an engine crankcase; and fastening means adapted to connect the breather device to the engine.

2. The device of claim 1, further including a flexible tubular member connected at one end to the opening in the cover member and at another end to an air intake.

3. The device of claim 1, wherein the baffle elements have fastener openings for connecting the baffle elements to the cooling fins of the engine.

4. The device of claim 1, wherein the base member, baffle elements and cover member are composed of a resinous plastic material.

5. A combined engine breather device with cooling baffles comprising:

a base member adapted to fit in the vee of a vee-type engine;

a cover member connected to the base member and having an opening therein;

a gasket positioned between the base member and the cover member and having an opening therein;

baffle elements projecting outwardly from the base member and constructed in a one-piece manner therewith;

a conduit member extending from a floor of the base member for communication with a passage in an engine crankcase; and fastening means adapted to connect the breather device to the engine.

6. The device of claim 5, further including baffle portions positioned in the base member between the floor of the base member and the cover member and in contact with the gasket.

7. A combined engine breather device with cooling baffles comprising:

a base member adapted to fit in the vee of a vee-type engine;

a cover member connected to the base member and having an opening therein;

baffle elements projecting outwardly from the base member and constructed in a one-piece manner therewith;

a conduit member extending from a floor of the base member for communication with a passage in an engine crankcase;

a valve member connected to the conduit member; and fastening means adapted to connect the breather device to the engine.

8. The device of claim 7, wherein the valve member includes a reed.

* * * * *